United States Patent [19]

Hornig et al.

[11] 4,114,472

[45] Sep. 19, 1978

[54] INSTALLATION FOR VIBRATION DAMPING IN DRIVE CONNECTION OF MOTOR VEHICLES

[75] Inventors: Rudolf Hörnig, Esslingen; Bruno Beeskow, Bietigheim; Günter Wörner, Rommelshausen, all of Germany

[73] Assignee: Daimler-Benz Aktiengesellschaft, Germany

[21] Appl. No.: 710,160

[22] Filed: Jul. 30, 1976

[30] Foreign Application Priority Data

Aug. 2, 1975 [DE] Fed. Rep. of Germany ....... 2534684

[51] Int. Cl.² .......................... F16D 13/78; F16D 3/58
[52] U.S. Cl. ..................... 74/574; 64/11 R; 64/1 V
[58] Field of Search .............. 74/574, 573; 64/1 V, 11, 13, 27 NM

[56] References Cited

U.S. PATENT DOCUMENTS

| 2,834,226 | 5/1958 | Hirst | 74/574 |
| 3,222,953 | 12/1965 | Benjamen | 64/11 R |
| 3,308,637 | 3/1967 | Deuring | 64/13 |
| 3,478,539 | 11/1969 | Daur | 64/13 |

FOREIGN PATENT DOCUMENTS

2,113,357  10/1971  Fed. Rep. of Germany .............. 64/13

Primary Examiner—Benjamin W. Wyche
Assistant Examiner—R. C. Turner
Attorney, Agent, or Firm—Craig & Antonelli

[57] ABSTRACT

An installation for damping vibrations in the drive connection of motor vehicles with the aid of a vibration absorber whose absorber mass is constructed as annular body and is connected with at least one driving part of the drive connection by means of an elastic member of rubber or analogous material; the connection between the transmission output shaft and the universal joint shaft is thereby split up from a vibrational point of view by an elastic coupling soft in the radial direction while the vibration absorber is coordinated to the input of the universal joint shaft.

21 Claims, 3 Drawing Figures

INSTALLATION FOR VIBRATION DAMPING IN DRIVE CONNECTION OF MOTOR VEHICLES

The presents invention relates to an installation for the vibration damping in the drive connection of vehicles, especially of motor vehicles, with the aid of a vibration absorber whose absorbing mass is constructed as annular body and is connected with a part of the drive connection consisting at least of a change-speed transmission and of a universal joint shaft by means of an elastic body of rubber or technically equivalent material.

In the prior art installations of the aforementioned type, the engine-transmission block, primarily excited by inertia forces of the engine drive unit, forms together with the universal joint shaft a vibrational system whereby the transmission output shaft transmits as coupling member vibrational deflections in the radial direction. These vibrational deflections act as excitation on the universal joint shaft and forcibly produce radial vibrations which lead to a more or less strong noise formation. It is known to dampen these vibrations by absorbers at the transmission end which, however, requires considerable absorber masses and is disadvantageous in that respect. Furthermore, it would be in conformity with the teachings of physics to arrange absorbers in the anti-node. This would correspond in the instant case approximately to the center of the forward universal joint shaft. However, such a solution is disadvantageous because the connecting possibilities are missing at this location and because under certain circumstances, different universal joint shafts would be required with different types of vehicles.

The present invention is concerned with the task to avoid the described disadvantages. Accordingly, an installation is to be provided, by means of which a very good vibration damping or absorption results without the use of large masses, and which can be readily installed without additional means. Additionally, it should also make possible to utilize the same universal joint shaft for several vehicle types, i.e., though different, correctly matched absorbers are to be utilized in that case, the drive connection is to remain unchanged as to the rest.

The underlying problems are solved in accordance with the present invention in the installations of the aforementioned type in that the connection between the transmission output shaft and the universal joint shaft is split-up from a vibrational point of view by an elastic coupling which is soft in the radial direction and in that the vibration absorber is coordinated to the universal joint shaft input. A preferred solution of this invention utilizes an elastic coupling with a radially yielding rubber body as well as with a centering by means of a pin arranged at the transmission output shaft and by means of a centering sleeve coordinated to the universal joint shaft, between which is arranged a rubber sleeve or bush with sufficient radial elasticity.

Before the advantages of the solution of the present invention will be described, it should additionally be noted that the connection of the universal joint shaft with the transmission output shaft by means of a universal joint or by means of a so-called Hardy-disk is already known in the art. However, solely a jointed or articulated connection is achieved thereby, but not a splitting-up from a vibrational point of view of this drive connection in the radial direction. A universal joint, for example, is even completely rigid from a vibrational point of view and though the customary Hardy-disks have a joint function, they have so little radial yieldingness that they also have to be considered rigid from a vibrational point of view.

Consequently, even if one were to install in such prior art connections at the universal joint shaft input a vibration damper corresponding to an earlier proposal of the assignee of the present application (German Application No. P 25 08 212.6-12)—which, as to the rest, however, involves a completely different problem—the effect which is sought in the instant case according to the present invention could not be attained by such a combination.

The advantages of the solution of the present invention reside primarily in the fact that a very good absorption of the occurring vibrations is achieved with a small absorber mass. This is achieved in that the absorber action will be concentrated completely on the universal joint shaft or cardan shaft as a result of the uncoupling from a vibrational point of view of the transmission and universal joint shaft, conditioned on the slight radial rigidity of the joint-disk. The absorber itself responds also very well in this case. Finally, the proposed location is well suited for the installation and mounting of the absorber so that the assembly time can be shortened and also no additional means are required for the mounting. The universal joint shaft itself remains unchanged, and it can also be utilized in the same construction for several types of vehicles if other considerations do not speak against such use.

A solution is preferred in the present invention, according to which the absorber is secured by means of its support flange directly at the universal joint shaft flange and the universal joint shaft itself extends through the absorber. It is thereby within the scope of the inventive concept if also in this case the absorber serves both for the absorption of torsional vibrations of the drive connection as also of the bending vibrations of the universal joint shaft and if for that purpose the elastic body is delimited, on the one hand, by a cylinder surface and, on the other, by a polygonal surface. In detail it is then proposed for that purpose that the elastic body is arranged in the form of three segmentally shaped sections of a circle between the cylindrical inner circumference of an absorber mass and the axially parallelly bent-off edge of a triangularly shaped support flange.

Another feature of the present invention resides in that slot-shaped apertures are arranged in the elastic body between the tips of the support flange and the absorber mass, which extend in the circumferential direction. It is possible to influence by the length of these slots the frequency characteristics of the absorber, i.e., the location of the frequency or frequencies at which the absorber is effective. Furthermore, it is proposed that the ends of the slots terminate in larger rounded-off openings whereas in their center area, elastic material is still present at least at one of the rigid parts for the formation of an abutment at the other part. The distance may thereby be as small as possible. Narrow rubber layers are preferably still present also in the slot on both metal parts.

One embodiment according to the present invention provides that the fastening bores for the absorber at the universal joint or cardan shaft are provided in the support flange inside of its edge within the triangle tips. A further influencing of the frequency characteristics is possible in that according to the present invention, axially parallel bores are additionally provided in the segmentally shaped sections of the elastic body, which may be located along the same diameter as the bores in the support flange. These additional bores may then further serve for the passage of tools, by means of which the fastening means for the universal joint shaft and/or for other parts can be serviced.

A solution may be particularly advantageous, according to which elastic bodies and absorber masses of different frequency characteristics are arranged on the same support flange directly adjacent one another and separated only by a slot. As a result thereof, one is able to selectively enlarge the frequency response range of the absorber, or to match the same to two frequencies and to do so in a structurally very simple manner. For example, a construction is preferred therefor, according to which the elastic bodies are constructed identically on both sides of the slot whereas one absorber mass is more heavy than the other. This can be achieved, for example, in that one absorber body is axially longer than the other. Of course, also other solutions are feasible within the scope of the inventive concept, for example, also different elastic bodies may be used which can be achieved by different shapes and/or different rubber hardnesses.

Accordingly, it is an object of the present invention to provide an installation for damping and absorbing vibrations in the power train of motor vehicles which avoids by simple means the aforementioned shortcomings and drawbacks encountered in the prior art.

Another object of the present invention resides in an installation for the vibration damping in the drive connection of motor vehicles which not only suppresses noises in an effective manner but obviates the need for large absorber masses.

A further object of the present invention resides in an installation for damping vibrations in the drive connection of motor vehicles which can be installed by simple means in a relatively short period of time.

Still another object of the present invention resides in a vibration absorber of the type described above which eliminates the need for different universal joint shafts or cardan shafts for different types of vehicles.

Another object of the present invention resides in an installation of the type described above which produces a very good vibration absorption without the use of large masses.

A further object of the present invention resides in a vibration absorber of the type described above, in which the location of the frequency or frequencies at which the absorber is effective, can be readily influenced or shifted and adapted to existing requirements.

These and other objects, features and advantages of the present invention will become more apparent from the following description when taken in connection with the accompanying drawing which shows, for purposes of illustration only, two embodiments in accordance with the present invention, and wherein.

Figure 1:
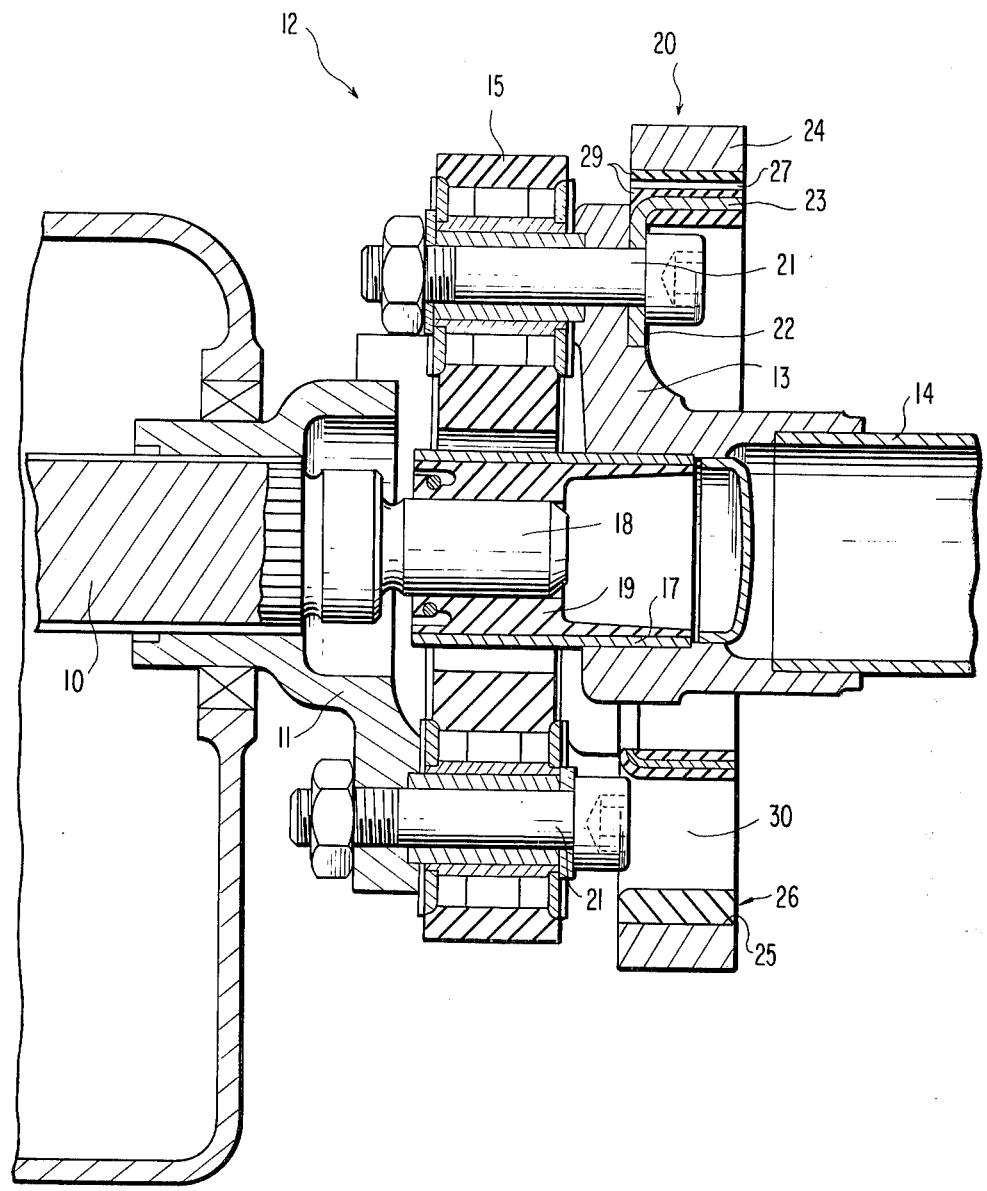
FIG. 1 is a longitudinal axial cross-sectional view through one embodiment of an absorber arrangement in accordance with the present invention.

Referring now the drawing wherein like reference numerals are used throughout the various views to designate like parts, according to FIG. 1, the transmission output shaft 10 is connected in the usual manner by means of a three-prong flange 11 by way of an elastic coupling generally designated by reference numeral 12 with the flange 13 also of three-prong construction which, in turn, is connected in a conventional manner with the universal joint shaft or cardan-shaft 14, not illustrated in detail. The construction of the elastic coupling 12 does not in its details form part of the present invention and may therefore be of any known construction; however, it is of particular importance that the elastic coupling 12 which is used has a relatively great radial softness by reason of a very soft rubber body 15. The same is true for the centering provided herein. For that purpose, a centering sleeve 17 is inserted into the flange 13, which surrounds a pin 18 at the transmission output shaft 10 under interposition of a rubber member 19. This rubber member 19 also exhibits a considerable softness in the radial direction. This very soft elastic coupling 12 serves for the separation of the vibrational system at this place.

Figure 2:
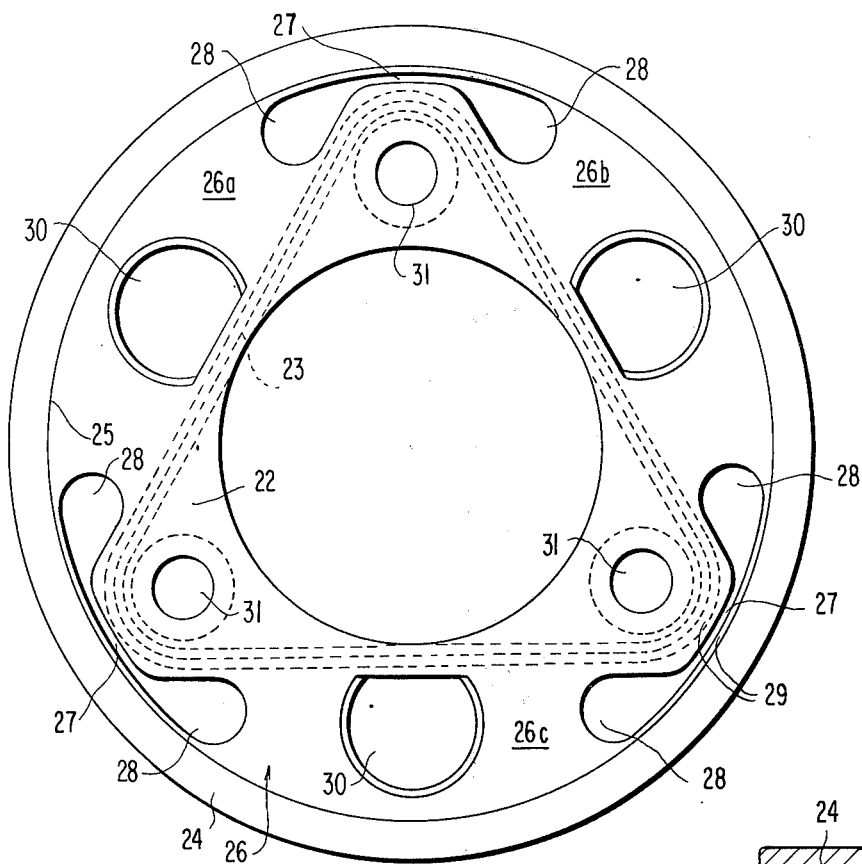
FIG. 2 is a side elevational view of the absorber according to FIG. 1.

An absorber generally designated by reference numeral 20 is directly secured at the star-shaped flange 13 of the universal joint shaft 14 by means of the same bolts 21 as the elastic coupling 12. The absorber 20 consists according to FIGS. 1 and 2 of a triangularly shaped support flange 22 whose outer edge 23 is bent off axially. An outer annular member 24 serves as absorber mass. The elastic body of the absorber generally designated by reference numeral 26 is located between the cylindrical inner circumference 25 of the annular member 24 and the axially bent-off edge 23 of the support flange 22. Consequently, the elastic body 26 of the absorber, by reason of the triangular shape of the support flange 22, consists essentially of three segmentally shaped members 26a, 26b and 26c (FIG. 2). Slots 27 are provided in this elastic member 26 at the tips of the triangularly shaped support flange 22, which terminate on both sides of the tips in larger rounded-off openings 28 (FIG. 2). The frequency characteristics of the absorber can be determined by these slots 27. Also in the slot 27 itself, remaining rubber layers 29 serve as abutment at the respective other part. A further adaptation or matching of the frequency characteristics can be achieved by openings 30 in the thick center part of the segmentally shaped members 26a, 26b and 26c, which openings may be located along the same diameter as the fastening bores 31 of the support flange 22 and which therefore may serve for the passage of tools for the fastening at the coupling 12 (see FIG. 1).

In the direction of rotation, the segmentally shaped elastic members 26a to 26c are stressed essentially in pure shear in their thick center portions, i.e., where the apertures 30 are arranged. In the corners, in contrast thereto, i.e., within the area of the slots 27 and of the rounded-off openings 28, a more or less large shear-/compression- and shear/tension-stress occurs. In the radial direction, the individual segments are stressed per rotation in tension, compression and shear, conditioned by the rotation and the deflection of the individual segments. An excessive radial deflection is absorbed by the abutment at the elastic layers 29.

Figure 3:
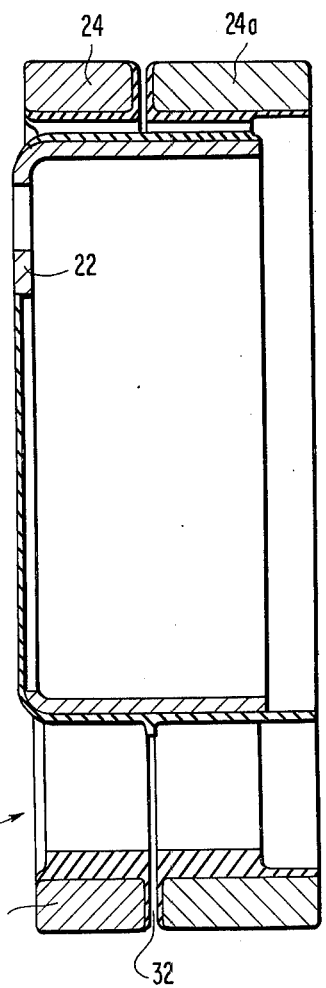
FIG. 3 is a longitudinal axial cross-sectional view similar to FIG. 1, of a modified embodiment of an absorber in accordance with the present invention.

FIG. 3 illustrates a vibration absorber constructed according to the same principle. The construction of the support flange 22 is the same as described hereinabove. However, the elastic member generally designated by reference numeral 26 and the annular member 24 serving as absorber mass are split-up or subdivided by a slot 32 perpendicular to the axis. Whereas the elastic members on both sides of the slot 32 are identical, the annular member 24a on one side of the slot 32 has a greater axial width. Consequently, it is heavier than the annular member 24 on the other side so that in this case a vibration absorber results having a different frequency characteristic, i.e., a different location of its effective frequency. The entire vibration absorber has therefore an enlarged frequency range. The installation and mounting take place in the same manner as already described hereinabove.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for damping vibrations in a drive connection of vehicles with the aid of a vibration absorber means whose absorber mass is constructed as an annular member, the absorber mass being connected by way of elastic means with a driving part of the drive connection consisting at least of a transmission means having an output shaft and of a universal joint shaft means having an input, characterized in that the connection between the transmission output shaft and the universal joint shaft means comprises an elastic coupling means which is sufficiently radially yielding to effect a separation of the vibrational system of the drive connection, and in that the vibration absorber means is coordinated to the universal joint shaft input.

2. An installation according to claim 1, characterized in that the elastic means is made of rubber or equivalent material.

3. An installation according to claim 1, characterized in that the elastic coupling means includes a radially yielding elastic member, and centering means including a pin arranged at the transmission output shaft, a centering sleeve coordinated to the universal joint shaft means, and an elastic bush means having sufficient radial elasticity arranged between said centering sleeve and said pin.

4. An installation according to claim 3, characterized in that the absorber means includes a support flange and the universal joint shaft means includes a universal joint shaft flange, said support flange being directly secured at the universal joint shaft flange while the universal joint shaft means extends at least partly through the absorber means.

5. An installation for damping vibrations in a drive connection of vehicles with the aid of a vibration absorber means whose absorber mass is constructed as an annular member, the absorber mass being connected by way of elastic means with a driving part of the drive connection consisting at least of a transmission means having an output shaft and of a universal joint shaft means having an input, characterized in that the connection between the transmission output shaft and the universal joint shaft means comprises an elastic coupling means which is sufficiently radially yielding to effect a separation of the vibrational system of the drive connection, and in that the vibration absorber means is coordinated to the universal joint shaft input; wherein the elastic coupling means includes a radially yielding elastic member, and centering means including a pin arranged at the transmission output shaft, a centering sleeve coordinated to the universal joint shaft means, and an elastic bush means having sufficient radial elasticity arranged between said centering sleeve and said pin; wherein the absorber means includes a support flange and the universal joint shaft means includes a universal joint shaft flange, said support flange being directly secured at the universal joint shaft flange while the universal joint shaft means extends at least partly through the absorber means; and wherein the elastic means is arranged in the form of three segmentally shaped sections between the substantially cylindrical inner circumference of the absorber mass and the axially parallelly bent-off edge of the substantially triangularly-shaped support flange.

6. An installation according to claim 5, characterized in that slot-shaped apertures are provided in the elastic means between the tips of the support flange and the absorber mass, said slot-shaped apertures extending substantially in the circumferential direction.

7. An installation according to claim 6, characterized in that the ends of the slots of said slot-shaped apertures terminate in larger rounded-off openings whereas in the center area thereof, elastic material is still present at least at one of the rigid parts for the formation of an abutment at the other part.

8. An installation according to claim 7, characterized in that fastening bores for the absorber means at the universal joint shaft means are provided in the support flange inside of its bent-off edge within the area of the triangular tips.

9. An installation according to claim 8, characterized in that axially parallel bores for influencing the frequency characteristics are provided in the segmentally shaped sections of the elastic means.

10. An installation according to claim 9, characterized in that said axially parallel bores are located substantially along the same diameter as the bores in the support flange.

11. An installation according to claim 9, characterized in that elastic members forming part of the elastic means and absorber masses of different frequency characteristics are arranged on the same support flange directly adjacent one another and separated only by a slot.

12. An installation according to claim 11, characterized in that the elastic members on both sides of the slot are substantially identical whereas one absorber mass is heavier than the other.

13. An installation according to claim 1, characterized in that the absorber means includes a support flange and the universal joint shaft means includes a universal joint shaft flange, said support flange being directly secured at the universal joint shaft flange.

14. An installation for damping vibrations in a drive connection of vehicles with the aid of a vibration absorber means whose absorber mass is constructed as an annular member, the absorber mass being connected by way of elastic means with a driving part of the drive connection consisting at least of a transmission means having an output shaft and of a universal joint shaft means having an input, characterized in that the connection between the transmission output shaft and the universal joint shaft means comprises an elastic coupling means which is sufficiently radially yielding to effect a separation of the vibrational system of the drive connection, and in that the vibration absorber means is coordinated to the universal joint shaft input; wherein the absorber means includes a support flange and the universal joint shaft means includes a universal joint shaft flange, said support flange being directly secured at the universal joint shaft flange; and wherein the elastic means is arranged in the form of three segmentally shaped sections between the substantially cylindrical inner circumference of the absorber mass and the axially parallelly bent-off edge of the substantially triangularly shaped support flange.

15. An installation according to claim 14, characterized in that slot-shaped apertures are provided in the elastic means between the tips of the support flange and the absorber mass.

16. An installation according to claim 15, characterized in that the ends of the slots of said slot-shaped apertures terminate in larger rounded-off openings whereas in the center area thereof, elastic material is still present at least at one of the rigid parts for the formation of an abutment at the other part.

17. An installation according to claim 14, characterized in that fastening bores for the absorber means at the universal joint shaft means are provided in the support flange inside of its bent-off edge within the area of the triangular tips.

18. An installation according to claim 14, characterized in that axially parallel bores for influencing the frequency characteristics are provided in the segmentally shaped sections of the elastic means.

19. An installation according to claim 18, characterized in that said axially parallel bores are located substantially along the same diameter as the bores in the support flange.

20. An installation for damping vibrations in a drive connection of vehicles with the aid of a vibration absorber means whose absorber mass is constructed as an annular member, the absorber mass being connected by way of elastic means with a driving part of the drive connection consisting at least of a transmission means having an output shaft and of a universal joint shaft means having an input, characterized in that the connection between the transmission output shaft and the universal joint shaft means comprises an elastic coupling means which is sufficiently radially yielding to effect a separation of the vibrational system of the drive connection, and in that the vibration absorber means is coordinated to the universal joint shaft input; wherein the absorber means includes a support flange and the universal joint shaft means includes a universal joint shaft flange, said support flange being directly secured at the universal joint shaft flange; and wherein elastic members forming part of the elastic means and absorber masses of different frequency characteristics are arranged on the same support flange directly adjacent one another and separated only by a slot.

21. An installation according to claim 20, characterized in that the elastic members on both sides of the slot are substantially identical whereas one absorber mass is heavier than the other.

* * * * *